M. A. KINNEY.
ANIMAL TRAP.
APPLICATION FILED NOV. 22, 1909.
997,393.
Patented July 11, 1911.
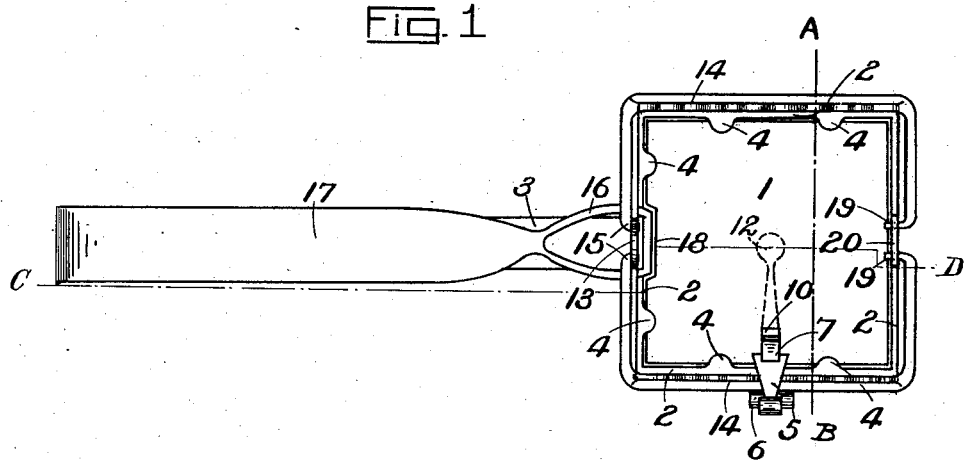
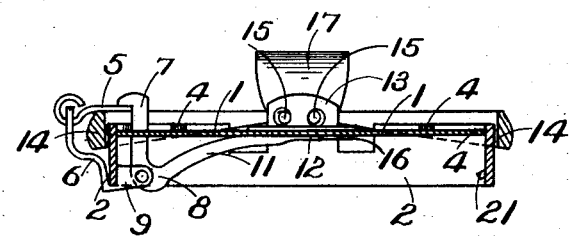
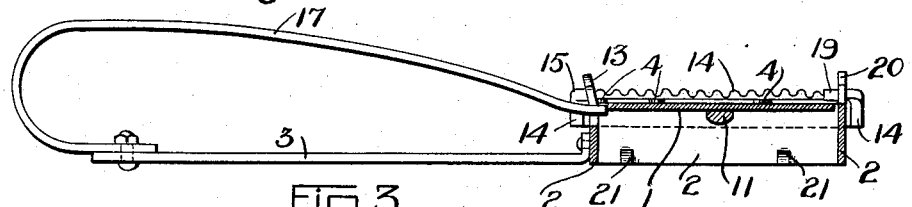
Inventor
Michael Alexander Kinney

UNITED STATES PATENT OFFICE.

MICHAEL ALEXANDER KINNEY, OF HYDE, NEW ZEALAND.

ANIMAL-TRAP.

997,393.  Specification of Letters Patent.  Patented July 11, 1911.

Application filed November 22, 1909. Serial No. 529,352.

*To all whom it may concern:*

Be it known that I, MICHAEL ALEXANDER KINNEY, a subject of the King of Great Britain, residing at Hyde, Otago, New Zealand, have invented new and useful Improvements in Animal-Traps, of which the following is a specification.

This invention relates to animal traps of the class in which a pair of jaws are mounted at one end of a back bar, to the other end of which is secured one end of a flat spring whose other end has a D shaped opening embracing one end of the jaws, a tray being used with a catch and trigger whereby the jaws are held open when the trap is set until the treading of an animal on the tray releases the catch and permits the jaws to close under the influence of the spring. In most traps of this class the tray is hinged at one side close to the catch and trigger, and an animal passing quickly frequently does not release the catch owing to its insufficient pressure on the tray, especially when it treads on the tray near the catch. When the tray is hinged the pressure required to set off the trap varies at different parts of the tray. In some traps the tray is so hinged that pressure near the hinge will not set off the trap at all.

According to my invention the loose tray is free when the trap is set and no part of the releasing means is attached to the tray.

My invention is illustrated in the accompanying drawings in which—

Figure 1 is a plan of a trap embodying my improvements and Fig. 2 is a sectional end view on a larger scale of the same on the line A—B in Fig. 1. Fig. 3, is a longitudinal sectional view of the form shown in Fig. 1, taken on line C—D of Fig. 1 with one of the spring jaws omitted.

According to my invention, a large tray (1) is provided which is loose and is adapted to work up and down within a box (2) which is formed integral with or attached to the back bar (3) so as to form part of the trap, the box (2) having lugs (4) preferably integral therewith at intervals around its top edge and lugs (21) on its bottom edge to limit the movement of the tray (1). The usual flap catch (5) is used pivoted on a lug (6) projecting from one side of the box (2) but the trigger the notched upper end (7) of which projects above the tray (1) through a slot (10) in the latter, while its lower end (8) is pivoted beneath the tray (1) on an extension (9) of the lug (6) has a curved extension (11) underneath the tray (1) terminating in a button or disk (12) which lies underneath the middle point of the tray (1). The lug (13) on the box 2 which takes one end of the jaws (14) is preferably inclined backward to receive the pivots (15) at that end of the jaws and give them a greater bearing and so as to allow the D shaped part (16) of the usual flat spring (17), when it is depressed to set the trap, to clear the ends of the pivots (15) which are filed off close to the inner face of the lug (13) thus requiring only a small portion (18) of the tray to be cut out of the tray to give clearance to the end of the D part (16) of the spring (17). The pivots (19) at the other ends of the jaws (14) are pivoted on a lug (20) projecting from the edge of the box (2). The jaws are mounted with the pivots (15) (19) turned inward as shown instead of outward as is usual, thereby allowing the jaws (14) when depressed to pass over the edges of the box (2). The pivots (19) may be allowed to project over the tray (1) as shown in Fig. 1, thus taking the place of lugs (4) on that end of the box (2).

When the trap is set as shown in the drawings the pressure of the spring (17), through the jaw (14) and the flap catch (5), on the upper end (7) of the trigger, causes the button (12) on the extension (11) of the trigger to bear upward on the under surface of the tray (1) forcing the latter up to the top of the box (2) against the lugs (4). This central support of the tray (1) against the lugs (4) insures, from the treading of an animal on any part of the tray, substantially equal leverage on the upper end (7) of the trigger to release it and set off the trap, the treading of an animal on the side of the tray next the trigger being just as liable to set off the trap as its treading on the side of the tray remote from the trigger, and less pressure on the tray being required to set off the trap.

Having now described my invention, what I claim as new and desire to secure by Letters Patent is:—

1. An animal trap structure comprising in combination, a box frame open on both sides and provided with upper and lower sets of lugs spaced apart from each other, a trap tray filling the open space in said frame between said lugs and free and unconnected with the frame, trap jaws hinged to said structure, a spring for actuating said jaws, and a trip device holding said jaws open and engaging the tray to normally maintain the same in engagement with said upper lugs.

2. An animal trap structure comprising in combination, a box frame provided with an upper set of lugs, a trap tray filling the open space in said frame and engaging said lugs with its peripheral portion, said tray being free and unconnected with the frame, trap jaws hinged to said structure, a spring for actuating said jaws, and a trip device holding said jaws open and engaging the central portion of the tray to normally maintain the same in engagement with said lugs.

3. An animal trap structure comprising in combination, a frame provided with tray retaining means, a trap tray filling the open space in said frame and engaging said means, trap jaws hinged to said structure, a spring for actuating said jaws, and a trip device holding said jaws open and engaging the central portion of the tray to hold the same in engagement with said means.

4. An animal trap structure comprising in combination, trap jaws, a frame member having an open space, a trap tray-like element loosely disposed in said opening and free and unconnected with said frame, said frame having means preventing upward movement of said element, a spring for actuating said jaws, and a trip device for holding said jaws in an open position and engaging and supporting the tray-like element in said space, substantially as described.

In testimony whereof I have signed my name to this specification in the presence of two subscribing witnesses.

MICHAEL ALEXANDER KINNEY.

Witnesses:
JOHN RUTHERFORD PARK,
ERNEST WIFRED BOYCE CAREY.

---

Copies of this patent may be obtained for five cents each, by addressing the "Commissioner of Patents, Washington, D. C."